United States Patent
Kura et al.

(10) Patent No.: US 12,321,220 B2
(45) Date of Patent: Jun. 3, 2025

(54) VERIFICATION INFORMATION REVISING DEVICE, VERIFICATION INFORMATION REVISING METHOD, AND VERIFICATION INFORMATION REVISING PROGRAM

(71) Applicant: NIPPON TELEGRAPH AND TELEPHONE CORPORATION, Tokyo (JP)

(72) Inventors: Tsuneko Kura, Tokyo (JP); Seishi Ouchi, Tokyo (JP); Yuichi Komatsu, Tokyo (JP); Takeshi Nakatsuru, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 101 days.

(21) Appl. No.: 17/785,829

(22) PCT Filed: Dec. 17, 2019

(86) PCT No.: PCT/JP2019/049467
§ 371 (c)(1),
(2) Date: Jun. 15, 2022

(87) PCT Pub. No.: WO2021/124460
PCT Pub. Date: Jun. 24, 2021

(65) Prior Publication Data
US 2023/0015273 A1    Jan. 19, 2023

(51) Int. Cl.
*G06F 11/07* (2006.01)
(52) U.S. Cl.
CPC ...... *G06F 11/0772* (2013.01); *G06F 11/0769* (2013.01); *G06F 11/0793* (2013.01)
(58) Field of Classification Search
CPC ............. G06F 11/0772; G06F 11/0769; G06F 11/0793
(Continued)

(56) References Cited

U.S. PATENT DOCUMENTS

2004/0205420 A1* 10/2004 Seeley ................ G06F 11/0772
714/57
2012/0159255 A1* 6/2012 Havewala ........... G06F 11/1435
714/37
(Continued)

FOREIGN PATENT DOCUMENTS

JP    2019008377 A    1/2019
JP    2019008738 A    1/2019

OTHER PUBLICATIONS

Tripwire "Tripwire: De facto standard Tripwire of the change detection" [online] Accessed on Dec. 11, 2019, website: https://www.tripwire.co.jp/about/.
(Continued)

*Primary Examiner* — Yair Leibovich

(57) ABSTRACT

A verification information modification device includes processing circuitry configured to acquire, from each verification device that uses verification information of software to verify a file forming the software, an error log relating to erroneous detection that has occurred in the verification device, when it is determined that a same error has occurred in a predetermined number or more of verification devices based on the acquired error log, extract an error log of the error from acquired error logs and create information indicating verification information that has caused the erroneous detection and candidates for modification details of the verification information based on the extracted error log, and output the information indicating verification information that has caused the erroneous detection and candidates for modification details of the verification information.

8 Claims, 13 Drawing Sheets

(58) Field of Classification Search
USPC .......................................................... 714/48
See application file for complete search history.

(56) References Cited

U.S. PATENT DOCUMENTS

| | | | |
|---|---|---|---|
| 2013/0179865 A1* | 7/2013 | Neumeyer | G06F 8/61 717/127 |
| 2017/0139795 A1 | 5/2017 | Komano et al. | |
| 2018/0074929 A1 | 3/2018 | Kito et al. | |

OTHER PUBLICATIONS

Nikkei XTECH (2007) "Intel TXT improving security of virtual environment" [online] Accessed on Dec. 11, 2019, website! https://tech.nikkeibp.co.jp/it/article/COLUMN/20071114/287197/.

Beginning today! Linux system management (2010) "Today's topic-pay attention to temporary file" [online] Accessed on Jul. 11, 2019, website: http://www.usupi.org/sysad/180.html.

@IT (2016) "command (advanced level 2)-investigate package information (2)" [online] Accessed on Dec. 11, 2019, website: https://www.atmarkit.co.jp/ait/articles/1609/21/news015.html.

* cited by examiner

Fig. 4

| PACKAGE NAME | VERIFICATION INFORMATION ID | FILE PATH/DIRECTORY PATH INFORMATION | HASH VALUE | INDISPENSABLE ENTITY ATTRIBUTE | CONFIGURATION CHECK TARGET ATTRIBUTE | ACCESS SOURCE PERMISSION LIST | ... |
|---|---|---|---|---|---|---|---|
| httpd-2.4.6 | 0001 | /usr/sbin/httpd | 1bf80449... | INDISPENSABLE | TARGET | - | |
| httpd-2.4.6 | 0001 | /etc/httpd/conf/httpd.conf | - | INDISPENSABLE | TARGET | /usr/sbin/httpd | |
| tomcat-9.0.4 | 0003 | /opt/tomcat | dag32245... | NOT INDISPENSABLE | NOT TARGET | - | |
| clamav-0.100 | 0002 | /usr/share/clamav/clamd-gen | 4cd40878... | NOT INDISPENSABLE | NOT TARGET | - | |
| foo-0.1 | 0004 | /usr/share/foo/ | - | INDISPENSABLE | TARGET | - | |
| foo-0.1 | 0004 | /usr/share/foo/explain.doc | d332h5fc... | INDISPENSABLE | TARGET | - | |
| ... | | | | | | | |

Fig. 5

| PACKAGE NAME | PACKAGE ID | FILE PATH/ DIRECTORY PATH INFORMATION | HASH VALUE | INDISPENSABLE ENTITY ATTRIBUTE | CONFIGURATION CHECK TARGET ATTRIBUTE | ACCESS SOURCE PERMISSION LIST | USER SIGNATURE | PUBLIC KEY CERTIFICATE OF USER SIGNATURE | ... |
|---|---|---|---|---|---|---|---|---|---|
| httpd-2.4.6 | httpd-2.4.6.0001. storedevice_id | /usr/sbin/httpd | 1bf80449... | INDISPENSABLE | TARGET | - | eLX/hu+i... | AZgCAQAw... | |
| httpd-2.4.6 | httpd-2.4.6.0001. storedevice_id | /etc/httpd/conf/ httpd.conf | - | INDISPENSABLE | TARGET | /usr/sbin/ httpd | eLX/hu+i... | AZgCAQAw... | |
| tomcat-9.0.4 | tomcat-9.0.4.0003. storedevice_id | /opt/tomcat | dag32245... | NOT INDISPENSABLE | NOT TARGET | - | 7SNw1s+8... | 6AqCs2Jb... | |
| clamav-0.100 | clamav-0.100.0002. storedevice_id | /usr/share/clamav/ clamd-gen | 4cd40878... | NOT INDISPENSABLE | NOT TARGET | - | Q/b8FxGT... | azELMAkG... | |
| foo-0.1 | foo- 0.1.storedevice_id | /usr/share/foo/ | - | INDISPENSABLE | TARGET | - | 7Ex=$24B... | UYcfGXSm... | |
| foo-0.1 | foo- 0.1.storedevice_id | /usr/share/foo/ explain.doc | d332h5fc... | INDISPENSABLE | TARGET | - | 7Ex=$24B... | UYcfGXSm... | |
| ... | | | | | | | | | |

Fig. 6

| ERROR CAUSE | FILE PATH/DIRECTORY PATH INFORMATION | PACKAGE ID | |
|---|---|---|---|
| THERE IS MISMATCH OF HASH VALUES | /var/log/PkgA.log | PkgA0002-03. storedevice_id | ~601 |
| UNAUTHORIZED FILE IS FOUND IN CONFIGURATION CHECK DIRECTORY | /usr/share/ PkgB0001/temp.tmp | PkgB0001-01. storedevice_id | ~602 |
| THERE IS MISMATCH OF HASH VALUES | /etc/resolv.conf | resolver-01. storedevice_id | ~603 |
| INDISPENSABLE PATH IS NOT FOUND | /usr/share/foo/ explain.doc | foo-01. storedevice_id | ~604 |
| . . . | | | |

Fig. 7

| ERROR CAUSE | FILE PATH/DIRECTORY PATH INFORMATION | PACKAGE ID | VERIFICATION DEVICE ID |
|---|---|---|---|
| THERE IS MISMATCH OF HASH VALUES | /var/log/PkgA.log | PkgA0002-03 | verif0001, verif0002, verif0003, ... |
| UNAUTHORIZED FILE IS FOUND IN CONFIGURATION CHECK DIRECTORY | /usr/share/PkgB0001/temp.tmp | PkgB0001-01 | verif0001, verif0002, verif0003, ... |
| THERE IS MISMATCH OF HASH VALUES | /etc/resolv.conf | resolver-01 | verif0001, verif0002, verif0003, ... |
| INDISPENSABLE PATH IS NOT FOUND | /usr/share/foo/explain.doc | foo-01 | verifi2834 |
| ... | | | |

Fig. 8

| FILE PATH/DIRECTORY PATH INFORMATION | PATH TYPE | HASH VALUE |
|---|---|---|
| /var/log/PkgA.log | file | 8sjwjoax... |
| /usr/share/PkgB0001/temp.tmp | file | dg4ahra5... |
| /etc/resolv.conf | file | 3g35sdg4k... |
| /usr/share/foo/ | directory | -- |
| /usr/share/foo/explain.doc | file | d332h5fc... |
| ... | | |

Fig. 9

| FILE PATH/DIRECTORY PATH INFORMATION | PATH TYPE | HASH VALUE | VERIFICATION DEVICE ID |
|---|---|---|---|
| /var/log/PkgA.log | file | 8sjwjoax... | verif0001, verif0002, verif0003, ... |
| /usr/share/PkgB0001/temp.tmp | file | dg4ahra5... | verif0001, verif0002, verif0003, ... |
| /etc/resolv.conf | file | 3g35sdg4k... | verif0001, verif0002, verif0003, ... |
| /usr/share/foo/ | directory | – | verif0001, verif0002, verif0003, ... |
| /usr/share/foo/explain.doc | file | d332h5fc... | verfi2834 |
| ... | | | |

| FILE PATH/DIRECTORY PATH INFORMATION | ERRONEOUS DETECTION CAUSE | MODIFICATION PART | MODIFICATION DETAILS |
|---|---|---|---|
| /var/log/pkgA.log | DELETE SETTINGS OF HASH VALUE BECAUSE FILE IS REWRITTEN DURING EXECUTION | HASH VALUE | DELETE SETTINGS |
| /usr/share/ PkgB0001/temp.tmp | CHANGE CONFIGURATION CHECK TARGET ATTRIBUTE OF DIRECTORY TO "NOT TARGET" BECAUSE THERE IS UNAUTHORIZED FILE IN CONFIGURATION CHECK DIRECTORY | CONFIGURATION CHECK TARGET ATTRIBUTE | NOT TARGET |
| /etc/resolv.conf | CHANGE HASH VALUE AFTER CHECKING MODIFICATION OF FILE | HASH VALUE | CHANGE (3g35sdg4k...) |
| ... | | | |

VERIFICATION INFORMATION REVISING DEVICE, VERIFICATION INFORMATION REVISING METHOD, AND VERIFICATION INFORMATION REVISING PROGRAM

CROSS-REFERENCE TO RELATED APPLICATIONS

This application is a U.S. National Stage Application filed under 35 U.S.C. § 371 claiming priority to International Patent Application No. PCT/JP2019/049467, filed on 17 Dec. 2019, the disclosure of which is hereby incorporated herein by reference in its entirety.

TECHNICAL FIELD

The present invention relates to a verification information modification device, a verification information modification method, and a verification information modification program.

BACKGROUND ART

Hitherto, the technology of detecting change or tampering of a file related to software installed in various kinds of devices has been provided in order to confirm that there is no problem with the software in terms of security (integrity) (refer to Non Patent Literature 1 and 2). The software is updated through change of the settings or application of a security patch, for example. Thus, a system operator is requested to confirm integrity appropriately in a daily operation as well as at the time of introduction of the software.

CITATION LIST

Patent Literature

[PTL 1] Japanese Laid-open Patent Publication No. 2019-8738
[PTL 2] Japanese Laid-open Patent Publication No. 2019-8377

Non Patent Literature

[NPL 1] Tripwire, [online], [retrieved on 2019 Dec. 11], the Internet, <https://www.tripwire.co.jp/about/>
[NPL 2] Nikkei XTECH, "Intel TXT improving security of virtual environment", [online], [retrieved on 2019 Dec. 11], the Internet, <https://tech.nikkeibp.co.jp/it/article/COLUMN/20071114/287197 7>
[NPL 3] "Beginning today! Linux system management Today's topic-pay attention to temporary file", [online], [retrieved on 2019 Jul. 11], the Internet, <http://www.usu-pi.org/sysad/180.html>
[NPL 4] [rpm] command (advanced level 2)-investigate package information (2), [online], [retrieved on 2019 Dec. 11], the Internet, <https://www.atmarkit.co.jp/ait/articles/1609/21/news015.html>

SUMMARY OF THE INVENTION

Technical Problem

When integrity described above is confirmed, in some cases, integrity is confirmed only at a certain time point, integrity of general software cannot be confirmed, or verification information used for confirming integrity is requested to be set manually.

In order to solve the above-mentioned problem, for example, it is conceivable that information (for example, meta-information) included in a software package is used to automatically extract a binary file that is not rewritten, a configuration file that is not allowed to be rewritten, or the like as an integrity check target file, to thereby use the extracted file as verification information. Furthermore, when meta-information or the like included in a software package has a possibility of having an error, for example, it is conceivable that an installation operation and actual behavior of the software are analyzed to create verification information.

However, erroneous detection may occur due to an influence of the environment of a verification device or the like when integrity of software is confirmed through use of the above-mentioned verification information. In such a case, verification information to be used by the verification device is requested to be modified. However, the related art does not consider modification of verification information in a case where erroneous detection has occurred due to an influence of the environment of a verification device or the like.

In view of the above, the present invention has an object to solve the above-mentioned problem and modify verification information to be used by a verification device.

Means for Solving the Problem

In order to solve the above-mentioned problem, the present invention includes: processing circuitry configured to: acquire, from each verification device that uses verification information of software to verify a file forming the software, an error log relating to erroneous detection that has occurred in the verification device; when it is determined that a same error has occurred in a predetermined number or more of verification devices based on the acquired error log, extract an error log of the error from acquired error logs and create information indicating verification information that has caused the erroneous detection and candidates for modification details of the verification information based on the extracted error log; and output the information indicating verification information that has caused the erroneous detection and candidates for modification details of the verification information.

Effects of the Invention

According to the present invention, it is possible to modify verification information to be used by a verification device.

BRIEF DESCRIPTION OF DRAWINGS

FIG. 4 is a diagram illustrating an example of a verification information list.
FIG. 5 is a diagram illustrating an example of a signed verification information list.
FIG. 6 is a diagram illustrating an example of an error log.

FIG. 7 is a diagram illustrating an example of an error log list.

FIG. 8 is a diagram illustrating an example of file configuration information.

FIG. 9 is a diagram illustrating an example of a file configuration information list.

FIG. 10 is a diagram illustrating an example of an erroneous detection knowledge information list.

DESCRIPTION OF EMBODIMENTS

In the following, description is given of a mode (embodiment) for carrying out the present invention. The present invention is not limited to the embodiments described below. Verification information described below is information serving as a basis for verifying whether or not a file related to software installed in a device has been changed or tampered.

Figure 1:
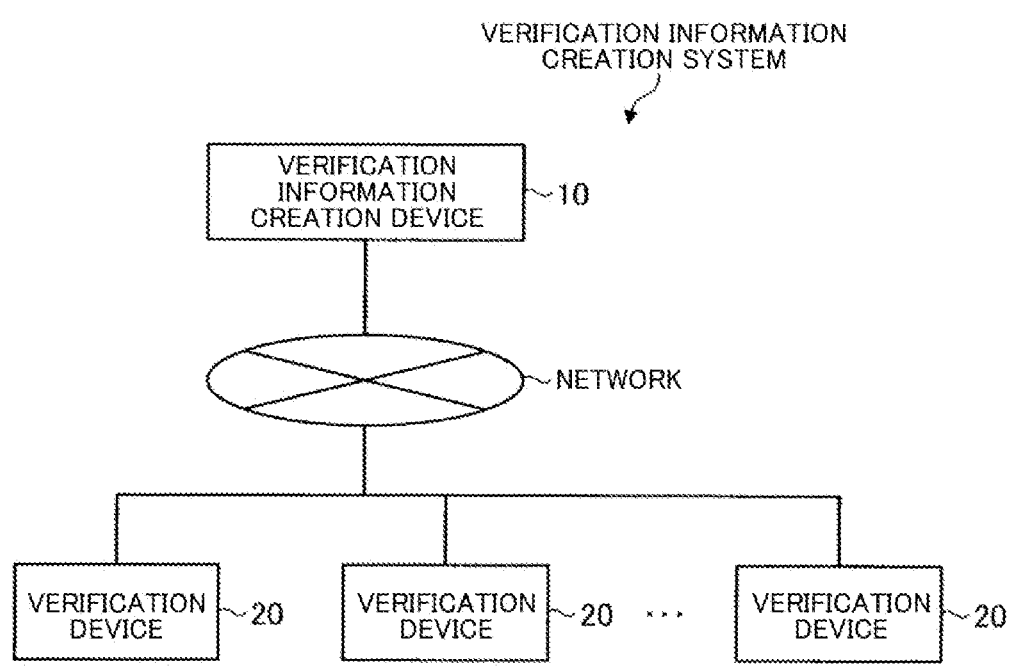
FIG. 1 is a diagram illustrating an exemplary configuration of a verification information creation system.

[Exemplary configuration] Now, description is given of an exemplary configuration of a verification information creation system with reference to FIG. 1. The verification information creation system includes, for example, a verification information creation device (verification information modification device) 10 configured to create and modify verification information of a software package, and a verification device 20 configured to execute verification processing for software installed in the own verification device 20 by using the verification information. The verification information creation device 10 and the verification device 20 are communicably connected to each other via a network such as the Internet.

[Outline] Next, description is given of an outline of the above-mentioned verification information creation system. For example, the verification information creation device 10 creates verification information on a software package, and transmits the created verification information to each verification device 20. After that, when some erroneous detection has occurred in verification by each verification device 20, the verification information creation device 10 modifies verification information that has caused erroneous detection. After that, the verification information creation device 10 transmits the modified verification information to the verification device 20.

Figure 2:
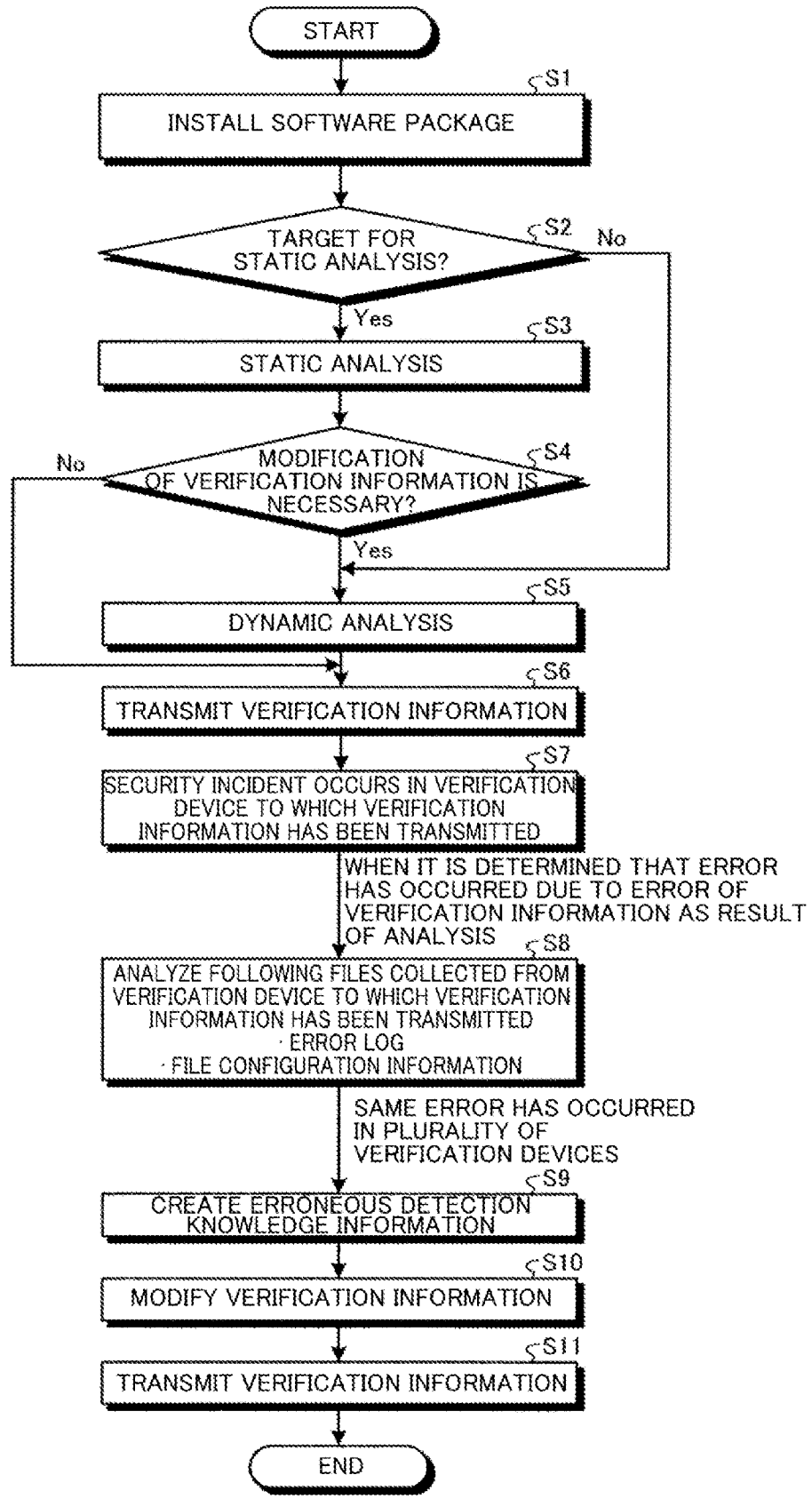
FIG. 2 is a diagram for describing an outline of operation of the verification information creation system.

Now, description is given of an exemplary processing procedure of the verification information creation system with reference to FIG. 2. For example, the verification information creation device 10 installs a software package into the verification device 20 (S1). When the software package installed in S1 is a target for static analysis (Yes in S2), the verification information creation device 10 executes static analysis of the software package (S3). This static analysis is to identify an installation destination or the like of software and acquire various kinds of information requested for creating verification information by analyzing the software package itself.

For example, the verification information creation device 10 executes static analysis of the software package when a directory serving as an installation destination of the software package is specified. Then, the verification information creation device 10 creates verification information based on information acquired by the above-mentioned static analysis.

On the other hand, when the software package installed in S1 is not a target for static analysis (No in S2), the verification information creation device 10 executes dynamic analysis of the software package (S5). This dynamic analysis is for the verification information creation device 10 to install software, which is to be installed into the verification device 20, into the verification information creation device 10, analyze actual behavior of a file or a directory at the time of operation of the software, and acquire various kinds of information requested for creating verification information.

For example, the verification information creation device 10 executes dynamic analysis of the software package when a directory serving as the installation destination of the software package is not specified. Then, the verification information creation device 10 creates verification information based on information acquired by the above-mentioned dynamic analysis. After that, the processing proceeds to S6.

Then, after S3, the verification information creation device 10 determines whether or not it is necessary to modify the verification information created based on the result of static analysis (S4), and when modification is not necessary (No in S4), the verification information creation device 10 transmits the verification information to the verification device 20 (S6). On the other hand, when it is necessary to modify the verification information (Yes in S4), the processing proceeds to S5.

After S6, when a security incident has occurred in the verification device 20, which is the transmission destination of the verification information (S7), the verification device 20 creates an error log relating to the above-mentioned security incident. For example, when the verification device 20 has tried to confirm (verify) integrity of software by using the verification information and confirmation of integrity has failed (error has occurred), the verification device 20 creates an error log. When it is determined that the error is due to an error of the verification information, the verification information creation device 10 collects an error log and file configuration information from the verification device 20, which is the transmission destination of the verification information, and analyzes the error log and file configuration information (S8: analyze the following files collected from the verification device, which is the transmission destination of the verification information).

As a result of analysis in S8, when the verification information creation device 10 has determined that the same error has occurred in a plurality of verification devices 20, the verification information creation device 10 creates erroneous detection knowledge information (refer to FIG. 10), which indicates candidates for modification details or the like of the verification information, based on the error log relating to the error and the file configuration information (S9). Then, the verification information creation device 10 modifies the verification information based on the erroneous detection knowledge information created in S8 (S10).

For example, the verification information creation device 10 outputs candidates for modification details or the like of the verification information, which has caused the error, based on the above-mentioned erroneous detection knowledge information. Then, when the verification information creation device 10 has received input of a selection of the modification details of the verification information from an operator or the like, the verification information creation device 10 modifies the verification information based on the input of a selection. After that, the verification information creation device 10 transmits the modified verification information to the verification device 20 (S11).

According to such a verification information creation system, even when erroneous detection has occurred due to an influence of the environment of the verification device 20 or the like, it is possible to modify verification information that has caused the erroneous detection and transmit the modified verification information to the verification device 20.

Figure 3:
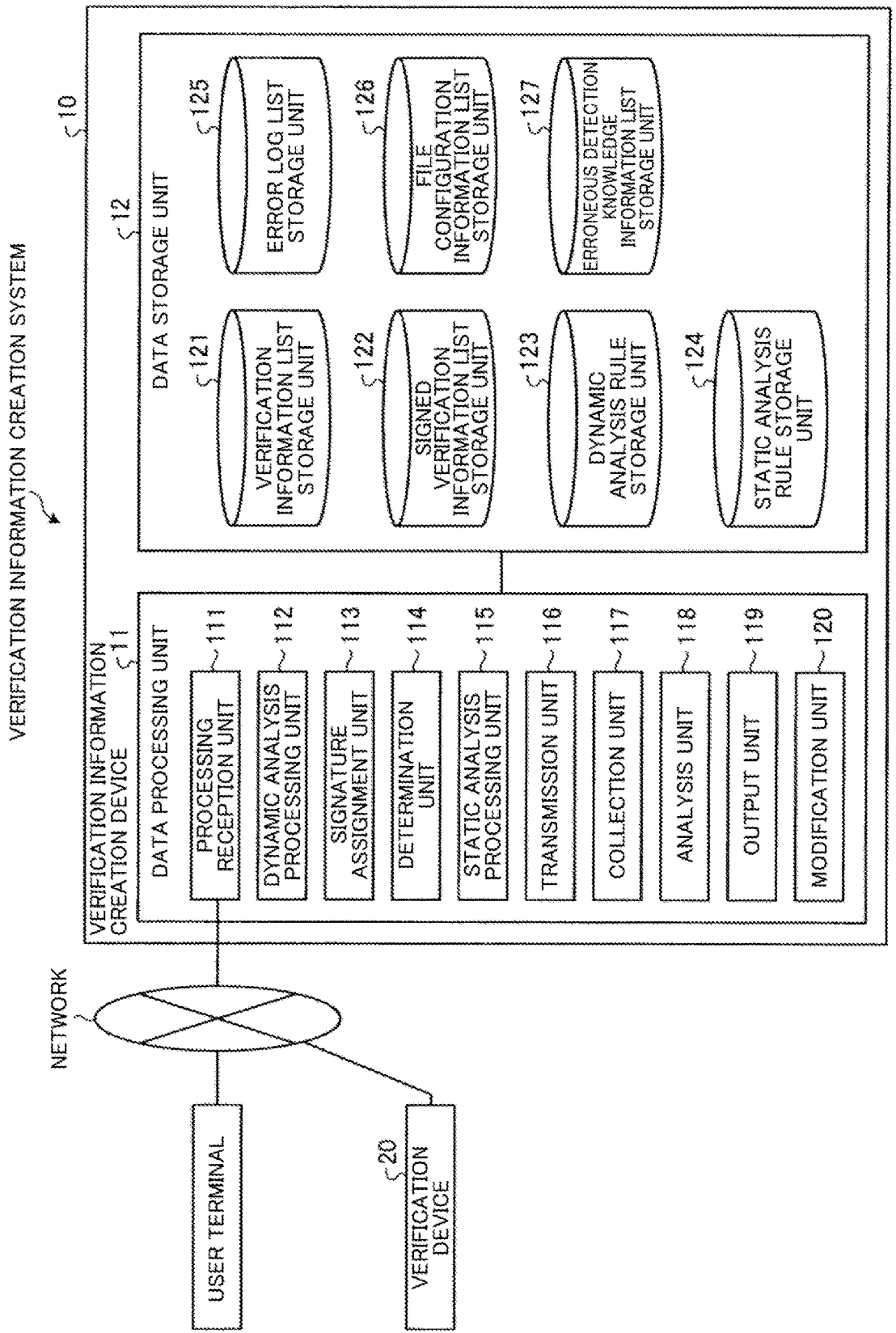
FIG. 3 is a diagram illustrating an exemplary configuration of a verification information creation device.

[Configuration] Next, description is given of an exemplary configuration of the verification information creation device 10 with reference to FIG. 3. The verification information creation device 10 includes a data processing unit 11 and a data storage unit 12. The verification information creation device 10 is connected to a user terminal via a network such as the Internet, for example.

First, description is given of the data storage unit 12. The data storage unit 12 includes a verification information list storage unit 121, a signed verification information list storage unit 122, a dynamic analysis rule storage unit 123, a static analysis rule storage unit 124, an error log list storage unit 125, a file configuration information list storage unit 126, and an erroneous detection knowledge information list storage unit 127.

The verification information list storage unit 121 stores a list (verification information list) of verification information. As illustrated in FIG. 4, the verification information includes, for example, a package name of a software package, a verification information ID, file path or directory path information on a verification target file, a hash value of the file, an indispensable entity attribute, and other information. Furthermore, as illustrated in FIG. 4, the verification information may include a configuration check target attribute, an access source permission list, and other information.

The indispensable entity attribute is attribute information indicating whether or not the file indicated by the file path/directory path information of the verification information is an indispensable file in a device in which the software package is installed.

The configuration check target attribute is attribute information indicating whether or not the file indicated by the file path/directory path information of the verification information is a target for checking the configuration.

The access source permission list is information indicating an execution file path of a program that is allowed to be accessed by a file indicated by the file path/directory path information of the verification information.

Information on the above-mentioned indispensable entity attribute, configuration check target attribute, and access source permission list is, for example, information input from the user terminal.

The signed verification information list storage unit 122 stores a signed verification information list (refer to FIG. 5). This signed verification information is information obtained by assigning the verification information with a user signature of the verification information creation device 10, which has created the verification information, and a public key certificate of the user signature. The package ID in the signed verification information list illustrated in FIG. 5 is an ID obtained by combining the package name of FIG. 4, the verification information ID of FIG. 4, and identification information on a device that stores the verification information.

The dynamic analysis rule storage unit 123 of FIG. 3 stores, for each software package, information (dynamic analysis rule) indicating a method of dynamic analysis to be used for creating verification information of the software package. This dynamic analysis rule is specified in the following manner, for example. Specifically, when a dynamic analysis processing unit 112 executes dynamic analysis for a tar file, the dynamic analysis processing unit 112 first identifies, for the tar file, an installation directory of software based on config.nice or config.status included in the tar file. Next, the dynamic analysis processing unit 112 determines whether or not each file is a file with content based on the type of each file stored in the identified installation directory. Then, the dynamic analysis processing unit 112 identifies the file determined to have content as a file that can take a hash value, and acquires a file path of the file and a hash value of the file, which concludes an example of the rule.

The static analysis rule storage unit 124 stores, for each software package, information (static analysis rule) indicating how to execute static analysis of the software package. For example, the static analysis rule is a rule in which an rpm command is executed for an rpm package, information on a binary file for which the hash value is checked at the time of verification of the file is acquired, and information on a configuration file that is not allowed to be rewritten is acquired.

The error log list storage unit 125 stores a list (error log list, refer to FIG. 7) of error logs collected by a collection unit 117.

As illustrated in FIG. 7, the error log list is, for example, information indicating a cause (error cause) of an error, a file path/directory path in which the error has occurred, a package ID of a file in which the error has occurred, an ID (verification device ID) of the verification device 20 in which the error has occurred, and the like.

For example, the error log in the first line of the error log list illustrated in FIG. 7 indicates that an error due to "mismatch of hash value" has occurred in a file specified by the file path/directory path "/var/log/PkgA.log" of the package ID "PkgA0002-03" in the verification device 20 of the verification device ID "verif0001, verif0002, verif0003, . . . ".

The file configuration information list storage unit 126 of FIG. 3 stores a list (file configuration information list, refer to FIG. 9) of file configuration information collected by the collection unit 117.

As illustrated in FIG. 9, the file configuration information list is, for example, information indicating file path/directory path information of the verification device 20, a path type of the file path/directory path information, a hash value of the file, an ID (verification device ID) of the verification device 20 serving as the transmission source of the file configuration information, and the like.

For example, information indicated by a reference numeral 901 of the file configuration information list illustrated in FIG. 9 indicates that the verification device 20 of the verification device ID "verif0001, verif0002, verif0003, . . . " stores a file in "/etc/resolv.conf", the path type of "/etc/resolv.conf" described above is a file, and the hash value of the file is "3g35sdg4k . . . ".

The above-mentioned error log list and file configuration information list are referred to when an analysis unit (information creation unit) 118 creates erroneous detection knowledge information (refer to FIG. 10).

The erroneous detection knowledge information list storage unit 127 stores a list (erroneous detection knowledge information list, refer to FIG. 10) of erroneous detection knowledge information created by the analysis unit 118.

As illustrated in FIG. 10, the erroneous detection knowledge information is information is, for example, information indicating file path/directory path information that has caused an error, a reason (erroneous detection reason) why the error has occurred, a candidate for a modification part of verification information for solving the error, a candidate for modification details of the modification part, and the like. This erroneous detection knowledge information list is referred to when an output unit 119 outputs a candidate for modification details of verification information that has caused erroneous detection.

Next, description is given of the data processing unit 11. The data processing unit 11 includes a processing reception unit 111, a dynamic analysis processing unit 112, a signature assignment unit 113, a determination unit 114, a static analysis processing unit 115, a transmission unit 116, a collection unit (acquisition unit) 117, an analysis unit 118, an output unit 119, and a modification unit 120.

The processing reception unit 111 receives a request for creating verification information of a software package from the user terminal, and returns the result.

The dynamic analysis processing unit 112 executes dynamic analysis of a software package for which verification information is to be created, and creates verification information.

For example, the dynamic analysis processing unit 112 reads, for a software package for which verification information is to be created, a rule for executing dynamic analysis of the software package from the dynamic analysis rule storage unit 123. Then, the dynamic analysis processing unit 112 installs the software package into the verification information creation device 10 in accordance with the read rule, and acquires a directory serving as the installation destination of software of the software package from the verification information creation device 10. After that, the dynamic analysis processing unit 112 identifies a file for which a hash value can be acquired based on the type of a file stored in the acquired directory. Then, the dynamic analysis processing unit 112 acquires a file path of the file for which a hash value can be acquired and the hash value of the file, and creates verification information by using the acquired information.

For example, the dynamic analysis processing unit 112 creates verification information (refer to FIG. 4) by using the package name of the software package, the verification information ID (for example, serial number), the file path or directory of a verification target file, the hash value of the file, and the like, which have been acquired by analysis of the software package. After that, the dynamic analysis processing unit 112 stores the created verification information into the verification information list storage unit 121, and returns information indicating completion of creation of the verification information to the user terminal.

When the processing reception unit 111 has received a command to read out verification information via the user terminal, the processing reception unit 111 reads verification information indicated by the read-out command from the verification information list storage unit 121, and transmits the read verification information to the user terminal. After that, when the processing reception unit 111 has received a modification of the verification information from the user terminal, the processing reception unit 111 stores verification information in which the correction is reflected into the verification information list storage unit 121.

The processing reception unit 111 may store verification information, which has been transmitted from an external device (for example, user terminal), into the verification information list storage unit 121.

The signature assignment unit 113 assigns verification information with a public key certificate of a user signature. For example, when the signature assignment unit 113 has received a request for assigning verification information with a signature from the user terminal, the processing reception unit 111 selects corresponding verification information from the verification information list storage unit 121, and passes the verification information to the signature assignment unit 113. Then, the signature assignment unit 113 stores, into the signed verification information list storage unit 122, verification information obtained by assigning the user signature of a device for which verification information is to be created and the public key certificate of the user signature to the verification information in which the verification information ID is replaced with a package ID (package name+verification information ID+identification information on device storing verification information).

The determination unit 114 determines whether or not the software package for which verification information is to be created is a software package serving as a target for static analysis. For example, when the software package for which verification information is to be created is a rpm package or a deb package, the determination unit 114 determines that the software package is a software package serving as a target for static analysis. On the other hand, when the software package for which verification information is to be created is not a rpm package or a deb package, the determination unit 114 determines the software package as a software package serving as a target for dynamic analysis.

The static analysis processing unit 115 uses the static analysis rule storage unit 124 to execute static analysis of the software package for which verification information is to be created, and uses the result of analysis to create verification information.

For example, the static analysis processing unit 115 reads, for the software package for which verification information is to be created, a rule for executing static analysis of the software package from the static analysis rule storage unit 124. Then, the static analysis processing unit 115 acquires information on a file having a low possibility of being changed in a daily operation from files included in the software package in accordance with the read rule.

For example, the static analysis processing unit 115 executes a predetermined command to acquire, from among the files included in the software, a file path of a file (for example, binary file) to be checked by using a hash value at the time of verification, a hash value of the file, and a file path of a configuration file that is not allowed to be rewritten. Furthermore, the static analysis processing unit 115 also acquires the package name of the software package and the verification information ID.

Then, the static analysis processing unit 115 creates, based on the information acquired by static analysis of the software package, verification information (refer to FIG. 4) indicating the package name of the software package, the verification information ID, the file path or directory path information on a verification target file, the hash value of the file, the indispensable entity attribute, and the like.

The transmission unit 116 transmits signed verification information stored in the signed verification information list storage unit 122 to the verification device 20. For example, when the transmission unit 116 has received a request for transmitting verification information from the verification device 20, the transmission unit 116 transmits signed verification information to the verification device 20 in response to the transmission request.

The collection unit 117 collects (acquires) an error log and file configuration information from each verification device 20.

First, description is given of an error log. The error log is a log indicating an abnormality (error) that has occurred at the time of execution of verification by each verification device 20 using verification information. This error log includes, for example, a plurality of rows as described below, and the head of each row is assigned with a tag ([false-positives]) indicating an error. In each row, the cause of an error, the file path of a file or the path of a directory in which the error has occurred (related path), the package ID of the file in which the error has occurred, and the like are described.

[false-positives] There is a mismatch of hash values: related path:/usr/test/aaa; package ID:PkgA0001.001.

[false-positives] The file for which a hash value is to be checked is not found: related path:/usr/test/bbb; package ID: PkgA0001.001

[false-positives] An unauthorized path is found in configuration check directory: related path:/usr/test/ccc; package ID PkgA0001.001

[false-positives] A necessary file is not found in the configuration check directory: related path:/usr/test/ddd; package ID: PkgA0001.001

[false-positives] A indispensable path is not found: related path:/usr/test/eee; package ID: PkgA0001.001

The collection unit 117 collects, for example, from each verification device 20 in which an error has occurred, an error log with a predetermined character string from among error logs by using a filtering function or the like. For example, the collection unit 117 collects an error log with a character string predicted to have a possibility of having erroneous verification information, such as "mismatch of hash values", from among error logs by using a filtering function or the like.

For example, the collection unit 117 collects error logs indicated by reference numerals 601 to 604 of FIG. 6 from a certain verification device 20 in which an error has occurred. Then, the collection unit 117 aggregates the error logs collected from each of the verification devices 20 in which an error has occurred, and creates an error log list illustrated in FIG. 7, for example. After that, the collection unit 117 stores the created error log list into the error log list storage unit 125.

Furthermore, the collection unit 117 collects file configuration information illustrated in FIG. 8 from a certain verification device 20 in which an error has occurred. Then, the collection unit 117 aggregates the pieces of file configuration information collected from each of the verification devices 20 in which an error has occurred, and creates a file configuration information list illustrated in FIG. 9. After that, the collection unit 117 stores the created file configuration list into the file configuration information list storage unit 126.

The analysis unit 118 analyzes the error log collected by the collection unit 117 from each verification device 20, and when the analysis unit 118 has determined that the same error has occurred in a predetermined number or more of verification devices 20, the analysis unit 118 creates, for verification information that has caused erroneous detection, information (for example, erroneous detection knowledge information (refer to FIG. 10)) indicating a candidate for modification details of the verification information based on the error log of the error that has occurred. The error log to be analyzed by the analysis unit 118 may be selected manually by an operator or the like. The same error is, for example, an error for which the error cause, the file path/directory path in which the error has occurred, the package ID, or the like is the same.

For example, the analysis unit 118 extracts, from the error log list illustrated in FIG. 7, entries (entries indicated by reference numeral 701) for which an error has occurred due to the same error cause in the same file/directory in three or more verification devices 20. Then, the analysis unit 118 uses the extracted entry and the file configuration information list (refer to FIG. 9) to create erroneous detection knowledge information (refer to FIG. 10).

For example, when the extracted entry has an error for which the error cause is "mismatch of hash values", the modification part of the verification information is a hash value, and thus the analysis unit 118 determines that the modification details are to change the hash value to a correct hash value described in the file configuration information (refer to FIG. 9) or to delete the settings of the hash value.

For example, among the entries indicated by the reference numeral 701 of FIG. 7, the error cause of "/etc/resolv.conf" is a mismatch of hash values of a file, and thus the analysis unit 118 extracts "3g35sdg4k . . . ", which is a hash value of the file "/etc/resolv.conf" from the file configuration information (refer to FIG. 9). Then, the analysis unit 118 describes a hash value as a candidate for the modification part of the verification information of "/etc/resolv.conf", and describes, in the erroneous detection knowledge information, information indicating change of the hash value in the verification information to "3g35sdg4k . . . " as the candidate for the modification details. Furthermore, the analysis unit 118 describes, in the erroneous detection knowledge information, information of "change the hash value after checking modification of the file" as an erroneous detection reason of "/etc/resolv.conf" (refer to an entry in the third row of FIG. 10).

Furthermore, when the extracted entry has an error for which the error cause is "an unauthorized file is found in the configuration check directory", the analysis unit 118 determines that the modification part of the verification information is "configuration check target attribute", and the modification details are to change the configuration check target attribute of the directory to "not target".

For example, among the entries indicated by the reference numeral 701 of FIG. 7, the error cause of "/usr/share/PkgB0001/temp.tmp" is existence of an unauthorized file in the configuration check directory. Thus, the analysis unit 118 describes a configuration check target attribute as a candidate for the modification part of the verification information of "/usr/share/PkgB0001/temp.tmp", and describes, in the erroneous detection knowledge information, information indicating change of the configuration check target attribute in the verification information to "not target" as the candidate for the modification details (refer to an entry in the second row of FIG. 10). Furthermore, the analysis unit 118 describes, in the erroneous detection knowledge information, information of "change the configuration check target attribute of the directory to "not target" because there is an unauthorized file in the configuration check directory" as the erroneous detection reason of "/usr/share/PkgB0001/temp.tmp".

The erroneous detection reason in the erroneous detection knowledge information may be described manually by an operator or the like. When the modification part and modification details of the verification information are not determined uniquely from the error cause, the analysis unit 118 describes all the candidates for the modification part and modification details in the erroneous detection knowledge information.

The part of verification information that has caused an error (erroneous detection) can be estimated from the cause of erroneous detection. The following four causes of erroneous detection are conceivable, for example.

[Example 1: erroneous detection caused because the verification target file indicated in verification information is a file updated at the time of verification] For example, when a log file for recording and storing the details of processing by the verification device 20 and a history of errors and the like is set as a verification target file indicated in verification information, the verification target file is updated every time the verification device 20 executes processing. Thus, when the verification device 20 has executed verification (integrity check) by using the verification information, the hash value of the file is changed, and thus an error (an error indicated by a reference numeral 601 of FIG. 6) indicating a mismatch of hash values of the file occurs.

[Example 2: erroneous detection caused because the configuration check directory indicated in verification information is a directory that includes or does not include a file depending on the situation of the verification device 20] For example, some shell script generates a temporary file only during execution of a script file (refer to Non Patent Literature 3). When the configuration check directory of the verification information is a directory specified as the generation destination of the above-mentioned temporary file and the verification device 20 executes verification (configuration check of file) by using the verification information, the verification device 20 determines that an unauthorized file is found in the configuration check directory of the verification information. Thus, an error (for example, an error indicated by a reference numeral 602 of FIG. 6) occurs.

[Example 3: erroneous detection caused because the hash value of a verification target file indicated in verification information is changed] For example, it is also conceivable that an operator installs the same software package into the plurality of verification devices 20 belonging to the same organization, and all the verification devices 20 change the configuration file of the software package depending on the organization. For example, when the operator has changed an IP address of a DNS server used by the organization, the details of the configuration file of the DNS server used by each verification device 20 are also changed. As a result, the hash value of the configuration file is also changed. When the verification target file of the verification information is the above-mentioned configuration file, the hash value before change of the configuration is set as the hash value of the verification target file, and the verification device 20 executes verification by using the verification information, an error (for example, an error indicated by a reference numeral 603 of FIG. 6) indicating a mismatch of hash values of the file occurs.

[Example 4: erroneous detection caused because the file registered as being indispensable in verification information is a file installed with an option] Software to be installed into the verification device 20 may change depending on an option set at the time of installation of a software package. For example, when software is installed by using an rpm command and rpm—install—excludedocs is specified, it is possible to prevent installation of a file assigned with a mark indicating a document such as a man page (refer to Non Patent Literature 4).

For example, it is assumed that there was a surplus capacity in a disk, and the verification information creation device 10 created verification information by installing the above-mentioned software package without setting an option, and transmitted the verification information to each verification device 20. However, each verification device 20 described above did not install an unnecessary file based on a policy of avoiding installing an unnecessary file. In this case, when each verification device 20 executes verification (indispensable file check) based on the verification information transmitted from the verification information creation device 10, an error (for example, error indicated by a reference numeral 604 of FIG. 6) indicating that an indispensable path is not found occurs.

The analysis unit 118 analyses which one of the above-mentioned causes the error cause is based on the error log. Then, the analysis unit 118 makes a summary about how and which part of the verification information is to be modified to solve the error based on the result of analysis, and creates erroneous detection knowledge information (refer to FIG. 10).

For example, as illustrated in FIG. 10, the analysis unit 118 describes, in the erroneous detection knowledge information, for each file path/directory path in which an error has occurred, a reason (erroneous detection reason) why the error has occurred in the directory path, a candidate (candidate for correction part) for the part of the verification information that has caused the error, and a candidate for the modification details of the part based on the result of analysis described above.

Now, specific examples are given. For example, the error corresponding to the example 1 is caused because the file is rewritten during execution of verification, and thus it is conceivable to perform modification of deleting the settings of the hash value in the verification information. Thus, the analysis unit 118 describes, in the erroneous detection knowledge information, for an error (for example, an error relating to /var/log/pkgA.log) estimated to correspond to the example 1 described above, information indicating that the candidate for the modification part of the verification information is "hash value" and the candidate for the modification details is "delete settings (of hash value)" (refer to an entry in the first line of FIG. 10).

In the case of errors corresponding to the example 2 and the example 4, the analysis unit 118 also refers to the file configuration information to describe the erroneous detection knowledge information.

For example, the error corresponding to the example 2 is caused because whether the directory of the configuration check target registered in the verification information includes a file or not changes depending on the situation of the verification device 20. Thus, it is conceivable to perform modification of changing the configuration check target attribute of the directory in the verification information to "not target". Therefore, for example, the analysis unit 118 also refers to the file configuration information of the verification device 20 to describe, in the erroneous detection knowledge information, for an error (an error relating to /usr/share/PkgB0001/temp.tmp) estimated to correspond to the example 2 described above, information indicating that the candidate for the modification part of the verification information is "configuration check target attribute" and the candidate for the modification details is "modify (configuration check target attribute) to "not target"" (refer to an entry in the second line of FIG. 10).

The error corresponding to the example 4 is caused because the file registered as being indispensable in verification information is a file that has a possibility of not being installed with an option. Thus, it is conceivable to perform modification of changing the indispensable entity attribute of the directory in the verification information to "not indispensable". Therefore, for example, the analysis unit 118 also refers to the file configuration information of the verification device 20 to describe, in the erroneous detection knowledge information, for an error (an error relating to /usr/share/foo/explain.doc) estimated to correspond to the example 4 described above, information indicating that the candidate for the modification part of the verification information is "indispensable entity attribute" and the candidate for the modification details is "modify (indispensable entity attribute) to "not indispensable"".

The error corresponding to the example 3 is caused because the hash value of the file registered in the verification information is changed. Thus, it is conceivable to perform modification of changing the hash value of the file in the verification information. Therefore, for example, the analysis unit 118 describes, in the erroneous detection knowledge information, for an error (an error relating to /etc/resolv.conf) determined to correspond to the example 3 described above, information indicating that the candidate for the modification part of the verification information is "hash value" and the candidate for the modification details is "change (of hash value)" (refer to an entry in the third line of FIG. 10). As the candidate for the modification details of the hash value, for example, a hash value indicated in the file configuration information (refer to FIG. 9) of the file in which the error has occurred may also be described.

The errors corresponding to the example 1 and the example 3 described above are both errors of "mismatch of hash values", but whether the error corresponds to the example 1 or the example 3 is estimated in the following manner, for example. For example, the analysis unit 118 estimates the type of the file in which an error has occurred based on the file name or extension of the file, and when the estimated type of the file is a log file, the analysis unit 118 estimates that the error corresponds to the example 1. Furthermore, when the estimated type of the file is a configuration file of the DNS server or the like, the analysis unit 118 estimates that the error corresponds to the example 3.

When the modification part and modification details of verification information can be identified based on the above-mentioned error cause, for example, the verification information creation device 10 holds the error cause in the data storage unit 12 in association with the modification part and modification details. Then, when the analysis unit 118 describes various kinds of information in the erroneous detection knowledge information, the analysis unit 118 may refer to the above-mentioned information to identify and describe the modification part, the modification details, and the like of the verification information based on the above-mentioned error cause.

The analysis unit 118 may fail to determine which one of the example 1 to the example 4 described above the error corresponds to based only on the details of the error log, the analysis unit 118 may determine that the error does not correspond to any one of the example 1 to the example 4 described above, or the analysis unit 118 may fail to identify the candidate for the modification part, the candidate for the modification details, and the like. In such a case, the analysis unit 118 may output all the potential erroneous detection reasons, candidates for the modification part, candidates for the modification details, and the like. Then, the analysis unit 118 reflects, in the erroneous detection knowledge information, the details of an erroneous detection reason, a candidate for the modification part, a candidate for the modification details, and the like, which are selected from the output candidates by an operator or the like.

The output unit 119 outputs the candidates for the modification part and the candidates for the modification details of the modification part of the verification information based on the erroneous detection knowledge information created by the analysis unit 118. For example, the output unit 119 outputs, based on the erroneous detection knowledge information list (refer to FIG. 10), information indicating that the candidate for the modification part of the verification information of the file path "/etc/resolv.conf" is the hash value, and the candidate for the modification details of the modification part is "change (3g35sdg4k . . . )" to the terminal of the operator (for example, user terminal indicated by FIG. 3).

The modification unit 120 modifies verification information. For example, after the output unit 119 has output, for verification information that has caused an error, the candidates for the modification part of the verification information and the candidates for the modification details of the modification part to the terminal of the operator, the modification unit 120 receives input of a selection of the modification part of the verification information and the modification details of the modification part, which is selected on the terminal of the operator. Then, the modification unit 120 modifies the verification information based on input of a selection by the operator. After that, the signature assignment unit 113 assigns the modified verification information with a signature, and stores the modified verification information into the signed verification information list storage unit 122. Then, the transmission unit 116 transmits the modified verification information assigned with the signature to each verification device 20 executing verification processing by using the verification information.

In this manner, the verification information creation device 10 outputs, for verification information that has caused erroneous detection of the verification device 20, candidates for the modification part of the verification information and candidates for modification details of the modification part. Then, the verification information creation device 10 modifies the verification information based on input of a selection by an operator. In this manner, even when erroneous detection has occurred due to an influence of the environment of the verification device 20 or the like, the operator can immediately grasp how and which part of which verification information is to be modified to solve the erroneous detection. As a result, the verification information creation device 10 can immediately modify verification information used by each verification device 20.

Figure 11:
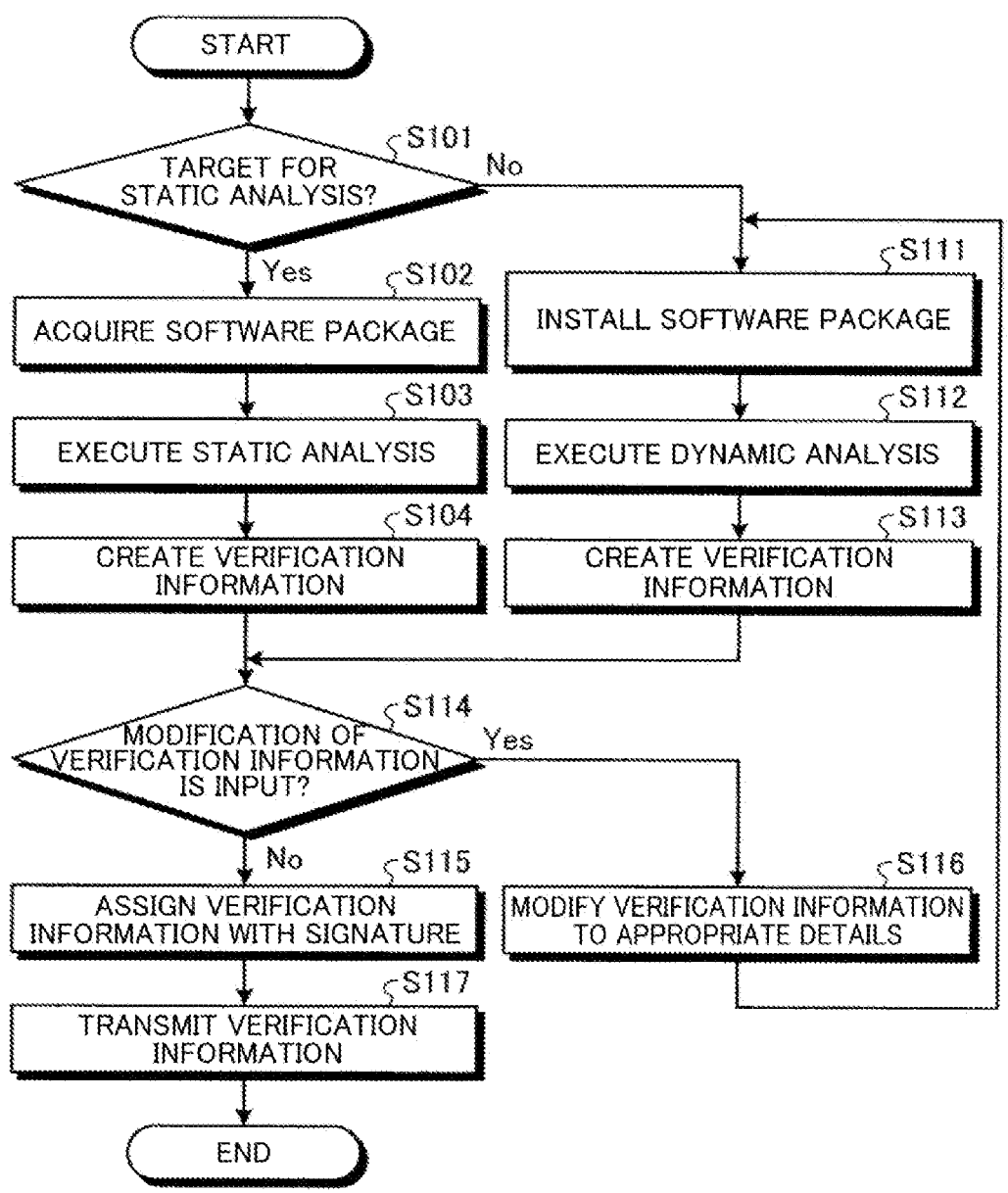
FIG. 11 is a flow chart illustrating an exemplary procedure of creating and transmitting verification information by the verification information creation device.
Figure 12:
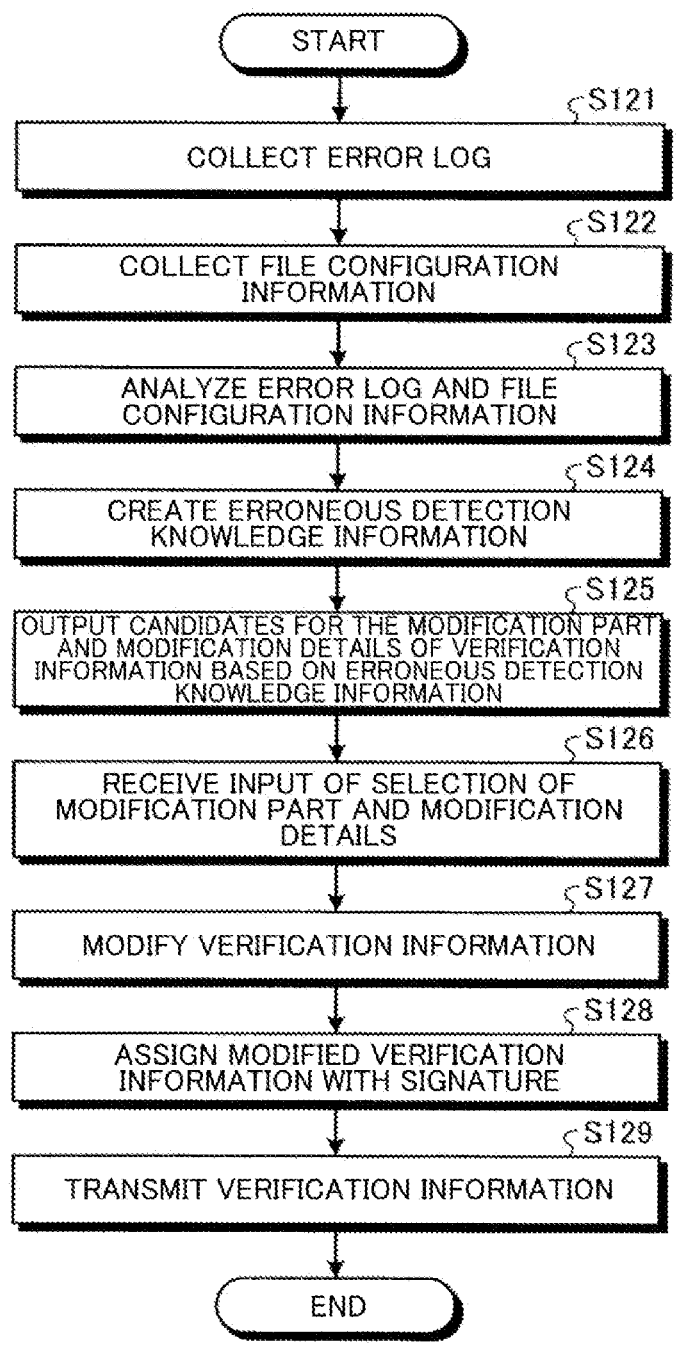
FIG. 12 is a flow chart illustrating an exemplary procedure of modifying and transmitting verification information by the verification information creation device.

[Example of processing procedure] Next, description is given of an exemplary processing procedure of the verification information creation device 10 with reference to FIG. 11 and FIG. 12.

First, the determination unit 114 of the verification information creation device 10 determines whether the software package for which verification information is to be created is package software serving as a target for static analysis (S101 of FIG. 11). When the determination unit 114 has determined that the software package for which verification information is to be created is package software serving as a target for static analysis (Yes in S101), the verification information creation device 10 acquires the software package (S102). Then, the static analysis processing unit 115 executes analysis of the software package based on the static analysis rule of the software package (S103).

After S103, the static analysis processing unit 115 creates verification information of the software package based on the result of analyzing the software package (S104). The static analysis processing unit 115 stores the created verification information into the verification information list storage unit 121. After that, when the processing reception unit 111 has received input of a modification of the verification information (Yes in S114), the processing reception unit 111 modifies the verification information to appropriate details (S116). Then, the processing proceeds to S111.

On the other hand, in S114, when the processing reception unit 111 has not received input of a modification of the verification information (No in S114), the signature assignment unit 113 assigns the verification information stored in the verification information list storage unit 121 with a user signature and a public key certificate of the user signature. Then, the signature assignment unit 113 stores the verification information assigned with the user signature and the public key certificate of the user signature into the signed verification information list storage unit 122 (S115: assign signature of verification information). After that, the transmission unit 116 transmits the signed verification information stored in the signed verification information list storage unit 122 to the verification device 20 in response to a request from the verification device 20, for example (S117).

In S101, when the determination unit 114 has determined that the software package for which verification information is to be created is not package software serving as a target for static analysis (No in S101), the verification information creation device 10 installs the software package for which verification information is to be created into the verification information creation device 10 (S111). Then, the dynamic analysis processing unit 112 executes dynamic analysis of the software package based on the dynamic analysis rule of the software package (S112). After that, the dynamic analysis processing unit 112 creates verification information of the software package based on the result of analyzing the software package (S113). Then, the processing proceeds to S114.

In this manner, the verification information creation device 10 can create verification information by static analysis for a software package for which verification information can be created by static analysis. After that, for example, the verification device 20 executes verification processing of the software package by using the above-mentioned verification information. As a result, when it is determined that the verification device 20 has detected a security incident and the security incident is due to an error of verification information (due to erroneous detection), the verification information creation device 10 executes the following processing.

First, the collection unit 117 of the verification information creation device 10 collects an error log from each verification device 20 in which erroneous detection has occurred (S121 of FIG. 12). Then, the collection unit 117 stores a list (error log list) of collected error logs into the error log list storage unit 125. Furthermore, the collection unit 117 collects the file configuration information of the verification device 20 from each verification device 20 described above (S122). Then, the collection unit 117 stores a list (file configuration information list) of collected file configuration information into the file configuration information list storage unit 126.

After S122, the analysis unit 118 analyzes an error log of the error log list and file configuration information of the file configuration information list (S123). Then, the analysis unit 118 creates erroneous detection knowledge information based on the result of analysis described above (S124). After that, the analysis unit 118 stores a list (erroneous detection knowledge information list) of created erroneous detection knowledge information into the erroneous detection knowledge information list storage unit 127.

After S124, the output unit 119 outputs candidates for the modification part and modification details of the verification information to be modified based on the erroneous detection knowledge information (S125). For example, the output unit 119 outputs the candidates for the modification part and modification details of the verification information to the terminal device of an operator. After that, when the modification unit 120 has received, from the terminal device of the operator or the like, input of a selection of the modification part and modification details of the verification information to be modified (S126), the modification unit 120 modifies the verification information based on the details of input of the selection (S127). Next, the signature assignment unit 113 assigns the modified verification information with a signature (S128). Then, the signature assignment unit 113 stores the verification information assigned with the signature into the signed verification information list storage unit 122. After that, the transmission unit 116 transmits the signed verification information stored in the signed verification information list storage unit 122 to the verification device 20 in response to a request from the verification device 20, for example (S129).

In this manner, the verification information creation device 10 outputs, for verification information that has caused erroneous detection of the verification device 20, candidates for the modification details of the verification information. Then, the verification information creation device 10 modifies the verification information based on input of a selection by an operator. In this manner, even when erroneous detection has occurred due to an influence of the environment of the verification device 20 or the like, the operator can immediately grasp how and which part of verification information is to be modified. As a result, the verification information creation device 10 can immediately modify verification information used by each verification device 20.

[Program] Furthermore, the function of the verification information creation device 10 described in the above-mentioned embodiment can be implemented by installing a program that realizes the function into a descried information processing device (computer). For example, it is possible to cause the information processing device to function as the verification information creation device 10 by causing the information processing device to execute the above-mentioned program provided as package software or online software. The information processing device herein includes a desktop computer, a laptop computer, a rack server, or the like. In other cases, the information processing device includes a mobile communication terminal such as a smartphone, a mobile phone, or a PHS (Personal Handyphone System), and further includes a PDA (Personal Digital Assistants) or the like. Alternatively, the verification information creation device 10 may be implemented on a cloud server.

Figure 13:
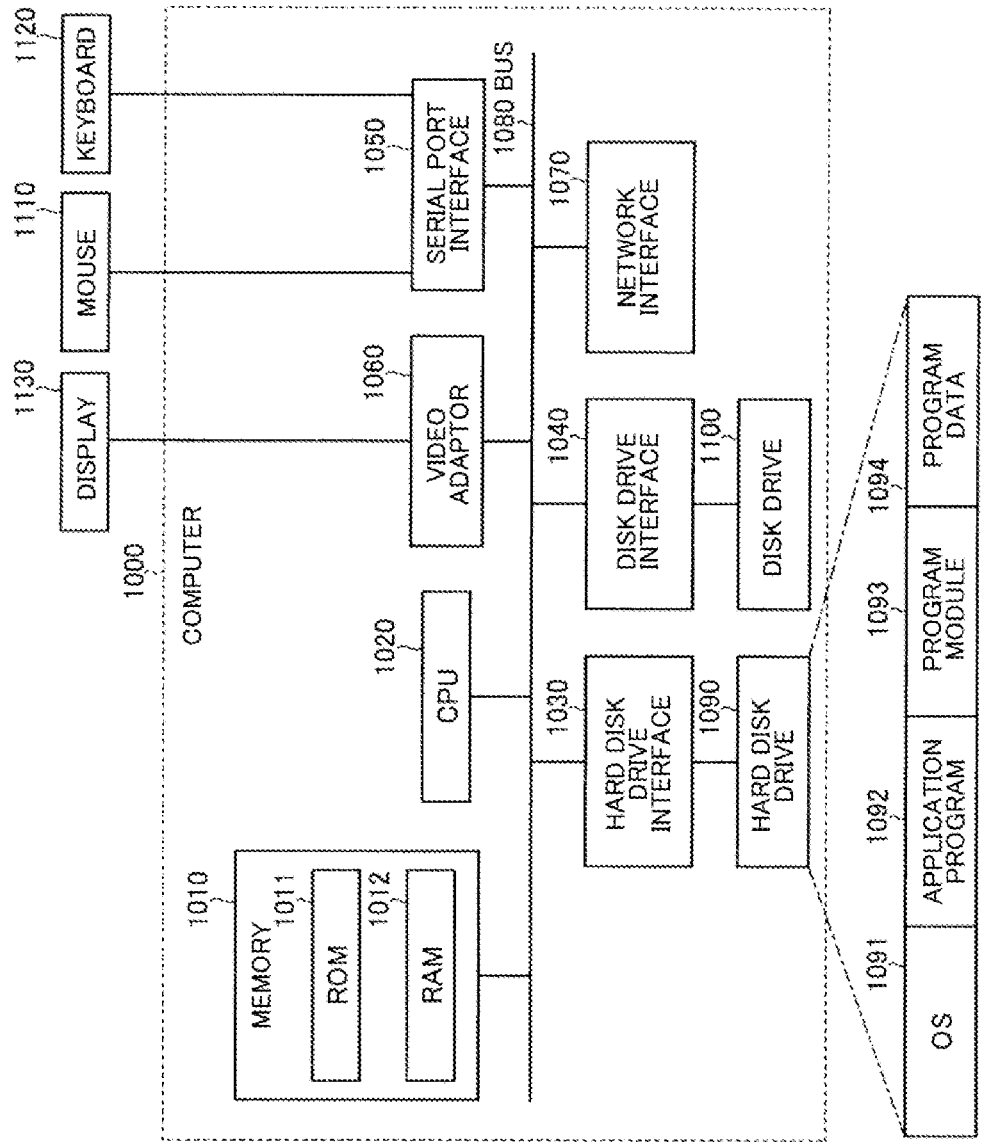
FIG. 13 is a diagram illustrating an exemplary configuration of a computer that executes a verification information creation program.

Now, using FIG. 13, description is given of an exemplary computer for executing the above-mentioned program (verification information creation program). As illustrated in FIG. 13, a computer 1000 includes, for example, a memory 1010, a CPU 1020, a hard disk drive interface 1030, a disk drive interface 1040, a serial port interface 1050, a video adaptor 1060, and a network interface 1070. These units are connected to one another via a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optimal disc is inserted into the disk drive 1100. For example, a mouse 1110 and a keyboard 1120 are connected to the serial port interface 1050. For example, a display 1130 is connected to the video adaptor 1060.

As illustrated in FIG. 13, the hard disk drive 1090 stores, for example, an OS 1091, an application program 1092, a program module 1093, and program data 1094. The data storage unit described in the above-mentioned embodiment is mounted in the hard disk drive 1090 or the memory 1010, for example.

Then, the CPU 1020 reads the program module 1093 and the program data 1094 stored in the hard disk drive 1090 as necessary into the RAM 1012, and executes each procedure described above.

The program module 1093 or the program data 1094 according to the above-mentioned verification information creation program may not only be stored in the hard disk drive 1090, but also be stored in a removable storage medium, for example, and read by the CPU 1020 via the disk drive 1100 or the like. Alternatively, the program module 1093 or the program data 1094 according to the above-mentioned program may be stored in another computer connected via a network such as a LAN, a WAN (Wide Area Network), or the like, and read by the CPU 1020 via the network interface 1070.

REFERENCE SIGNS LIST

10 Verification information creation device
20 Verification device
11 Data processing unit
12 Data storage unit
111 Processing reception unit
112 Dynamic analysis processing unit
113 Signature assignment unit
114 Determination unit
115 Static analysis processing unit
116 Transmission unit
117 Collection unit
118 Analysis unit
119 Output unit
120 Modification unit
121 Verification information list storage unit
122 Signed verification information list storage unit
123 Dynamic analysis rule storage unit
124 Static analysis rule storage unit
125 Error log list storage unit
126 File configuration information list storage unit
127 Erroneous detection knowledge information list storage unit

The invention claimed is:

1. A verification information modification device comprising:
processing circuitry configured to:
acquire, from each verification device of a plurality of verification devices, a first set of error logs of erroneous detections of anomaly by said each verification device, wherein each verification device verifies integrity of a file of a software application using verification information and detects anomaly of the integrity of the file, the first set of error logs comprises an error log, the error log indicates anomaly as erroneously detected by said each verification device in the integrity of the file of the software application according to a result of integrity verification as performed by said each verification device, and the error log indicates anomaly as erroneously detected by said each verification device because of the verification information being erroneous;
determine, based on a predetermined threshold of a number of error logs of a common type in the first set of error logs, an occurrence of a common type of erroneous detection of anomaly in said each verification device;
extract, based on the common type of the erroneous detection of anomaly by said each verification device, a second set of error logs from the first set of error logs, wherein the second set of error logs comprises respective error logs of the common type of the erroneous detection of anomaly;
identify verification information causing the common type of the erroneous detection of anomaly, wherein the verification information causing the common type of the erroneous detection of anomaly describes a cause of the common type of the erroneous detection of anomaly according to the extracted second set of error logs;
determine, based on the identified verification information causing the common type of the erroneous detection of anomaly, candidate information for modifying the verification information causing the common type of the erroneous detection of anomaly according to one or more error logs in the extracted second set of error logs to correct erroneously detected anomaly in integrity of the software application; and
output the identified verification information causing the common type of the erroneous detection of anomaly of the erroneous detection of anomaly and the determined candidate information to modify the verification information causing the common type of the erroneous detection of anomaly to correct the erroneous detection of anomaly.

2. The verification information modification device according to claim 1, wherein the processing circuitry is further configured to modify the verification information causing the common type of the erroneous detection of anomaly based at least in part on the candidate information.

3. The verification information modification device according to claim 1, wherein the processing circuitry is further configured to, when, based on the extracted second set of error logs, a cause of the erroneous detection of anomaly corresponds to content of a verification target file in the verification information of the erroneous detection of anomaly as updated by said each verification device, the candidate information for modification comprises deleting a hash value of the verification target file.

4. The verification information modification device according to claim 1, wherein the processing circuitry is further configured to
acquire configuration information on a file stored in said each verification device from respective verification devices of the plurality of verification devices, and
when, based on the extracted second set of error logs and the configuration information of the file stored in said each verification device, a cause of the erroneous detection of anomaly corresponds to a verification target directory with an additional file according to a condition of said each verification device, the candidate information for modification comprises excluding the verification target directory from a target of verification by said each verification device.

5. The verification information modification device according to claim 1, wherein the processing circuitry is further configured to acquire configuration information of a file stored in said each verification device from respective verification devices of the plurality of verification devices, and when, based on the extracted second set of error logs, the cause of the erroneous detection of anomaly corresponds to the acquired configuration information of the file that is optionally installed in said each verification device, the candidate information for modification comprises excluding the verification target file from a target of verification by said each verification device.

6. The verification information modification device according to claim 1, wherein the processing circuitry is further configured to acquire, as configuration information of a file stored in said each verification device, a hash value of the file from respective verification devices of the plurality of verification devices, and when, based on the extracted second set of error logs, the cause of the erroneous detection of anomaly corresponds to a configuration file of said each verification device, the candidate information for modification comprises modifying a first hash value of the verification target file indicated in the verification information of the erroneous detection of anomaly to a second hash value in the configuration information on the file.

7. A verification information modification method to be executed by a verification information modification device, the verification information modification method comprising:

acquiring, from each verification device of a plurality of verification devices that uses verification information of a software program to verify a file constituting the software program, a first set of error logs, wherein the first set of error logs indicates erroneous detection of anomaly in integrity of the software program as determined by said each verification device, and the verification information represents as a cause of the erroneous detection of anomaly in integrity of the software program;

determining indication that the first set of error logs comprises a plurality of error logs indicating the erroneous detection of anomaly occurring in same file names of files or same directory names of directories in said each verification device and one or more verification devices that are other than said each verification device in the plurality of verification devices, and a number of said each verification device and the one or more verification devices is more than a predetermined threshold;

extracting, when, based on the acquired first set of error logs indicating the determined indication of the first set of error logs, a second set of error logs from the acquired first set of error logs;

generating output information, the output information indicates the verification information representing as a cause of the erroneous detection of anomaly and candidate information for modifying the verification information representing as a cause of the erroneous detection of anomaly by analyzing the extracted second set of error log; and outputting the output information.

8. A non-transitory computer-readable recording medium storing therein a verification information modification program that causes a computer to execute a process comprising:

acquiring, from each verification device of a plurality of verification devices that uses verification information of a software program to verify a file constituting the software program, a set of error logs, wherein the first set of error logs indicates anomaly in integrity of the software program as erroneously detected by said each verification device because of the verification information being erroneous;

determining indication that the first set of error logs comprises a plurality of error logs indicating the erroneous detection of anomaly occurring in same file names of files or same directory names of directories in said each verification device and one or more verification devices that are other than said each verification device in the plurality of verification devices, and a number of said each verification device and the one or more verification devices is more than a predetermined threshold;

extracting, when, based on the acquired first set of error logs and the determined indication of the first set of error logs, the plurality of error logs as a second set of error logs from the acquired first set of error logs, wherein the second set of error logs describes the erroneous detection of anomaly occurring in files with the same file names or directories with the same directory names in said each verification device;

generating, based on analyzing the second set of error logs, output information, wherein the output information indicates the verification information representing as a cause of the erroneous detection of anomaly and candidate information for modifying the verification information representing as a cause of the erroneous detection of anomaly; and outputting the output information.

* * * * *